(No Model.)
F. C. ROCKWELL.
ELECTRIC LAMP.
No. 517,069. Patented Mar. 27, 1894.
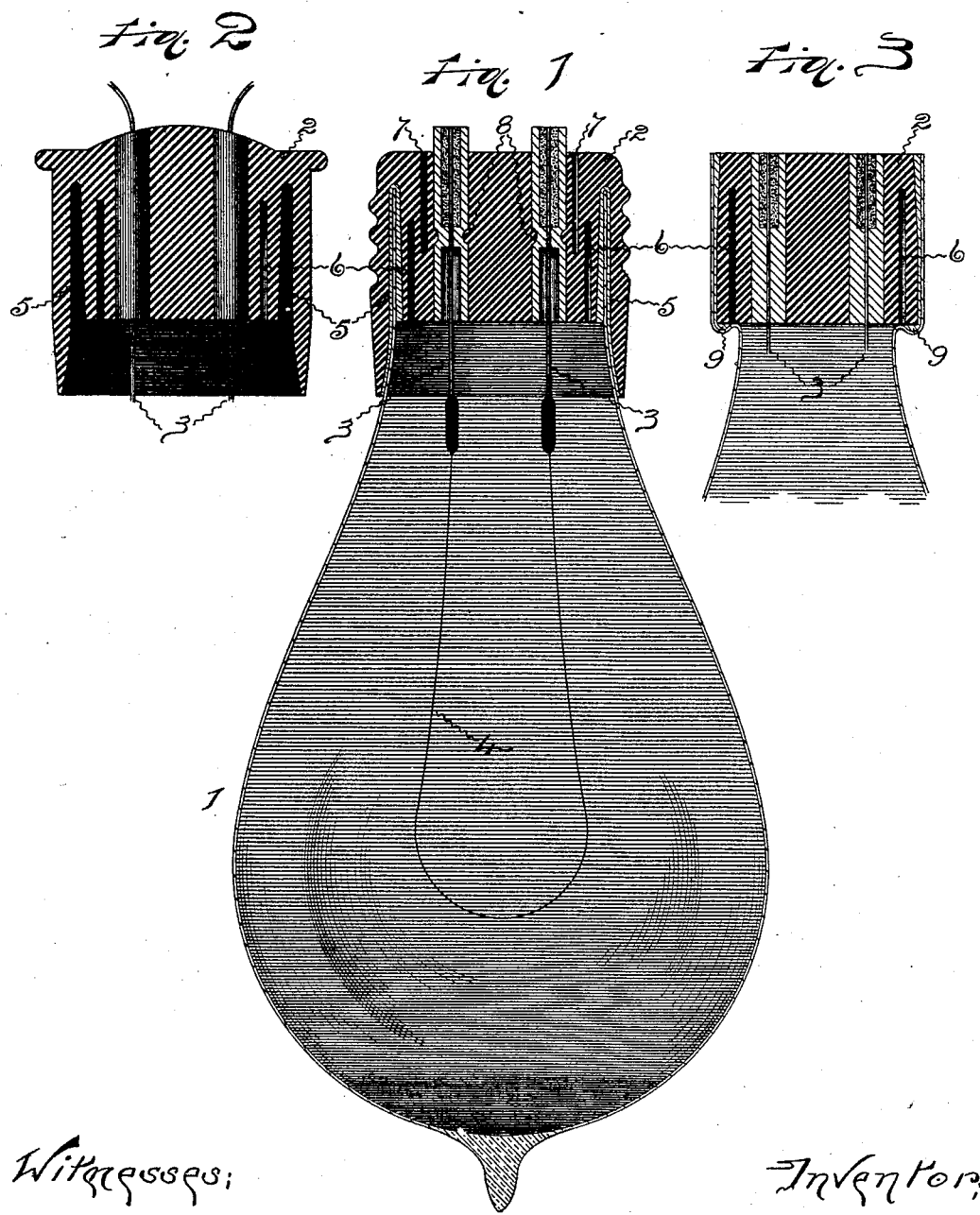

UNITED STATES PATENT OFFICE.

FREDERICK C. ROCKWELL, OF HARTFORD, CONNECTICUT.

ELECTRIC LAMP.

SPECIFICATION forming part of Letters Patent No. 517,069, dated March 27, 1894.

Application filed November 6, 1893. Serial No. 490,195. (No model.)

*To all whom it may concern:*

Be it known that I, FREDERICK C. ROCKWELL, a citizen of the United States, residing at Hartford, in the county of Hartford and State of Connecticut, have invented certain new and useful Improvements in Electric Lamps, of which the following is a specification.

The invention relates to the class of incandescent electric lamps that have the walls of the receiver made partly of glass and partly of molded composition; and the object is to provide a cheap and efficient lamp of this class having a glass globe with a molded base so constructed that it can be secured gas tight to the open mouth of the globe without any danger that changes of size or shape due to expansion and contraction under varying temperatures will crack the globe, fracture the base or open the joints, and permit the entrance of air into the receiver.

Referring to the accompanying drawings, Figure 1 is a central longitudinal section of a lamp constructed according to the invention. Fig. 2 is a similar section of a base of slightly modified construction, and Fig. 3 is a section of still another base embodying the invention.

In the views, 1 indicates the globe part of the receiver which is made of glass in any common manner, with the mouth left open, and this mouth is closed by a base 2, formed of insulating composition molded to the proper shape to fit the neck of the globe. The base may be composed of a fibrous body, as asbestus, and a hardening agent, or binder, as shellac, with oxide of lead, which composition would be subjected to heat and pressure in molds and compacted into such a hard condition as to be impervious to the passage of air or other gas. This material, which does not readily absorb heat, is practically unchangeable after being properly molded and compacted into a dense mass, but to provide for any change of size of the glass globe or of the material of the base itself due to the changes of temperature to which a lamp is subjected and still keep the joints between the base and the globe tight, one or more grooves may be made in the base to render the material properly elastic, if it does not itself possess the requisite amount of elasticity. During the process of formation conducting poles or tubes are molded into the composition for the attachment of the leading-in wires, 3, that connect with the filament, 4. The base shown in Fig. 1 of the drawings is molded to shape with a recess, 5, for receiving the open end of the globe, and in this recess, which is slightly larger than the glass, is put some cement that will harden so as to become gas tight. Such a cement may be formed of asphaltum and plaster of paris or it may be a porcelain cement. While this cement is in a plastic condition, the open mouth of the globe is forced into the recess so that a portion of the base extends upon the outside and a portion upon the inside of the neck of the globe, and when the cement hardens it makes an air tight seal between the globe and the base. Of course, the base may be put on the neck of the globe and the cement packed in the recess, and if the cement does not fill the entire space between the glass and the base, plaster of paris may be inserted to fill out the recess and stop what cracks there may be after the cement has hardened. When the base is formed an annular groove, 6, is made from the bottom into the body of the base, this groove usually extending a little more than half the distance through the base, and sometimes, as shown in Fig. 1—another groove, 7, is made from the top down into the body beyond the edge of the groove making up the bottom without, however, meeting it. These grooves permit an elastic yielding of the material of the base and allow an expansion and contraction without opening any seams, cracks or joints, should there be any tendency of the substances employed to change form or size under the influence of the varying temperatures. The poles that are molded into the base are usually provided with grooves, 8, or indentations on their exterior to prevent any possible chance of their working loose and letting air around them into the receiver, and they are bored out so as to have a portion with an opening that is just the right size to receive and tightly hold the leading-in wires, and a portion with an opening that is somewhat larger in diameter, into which is poured the solder that joins the wires to the poles or tubes. The tubes shown in Fig. 1 of the drawings are also bored out larger at the inner ends to provide spaces around the walls so that the tubes will absorb as little as possible of the heat of the wires.

In Fig. 1 the base is shown as formed with a screw thread on the exterior to receive one of the common forms of sockets, and the poles project outward so that they can make contact with the poles of the socket, while in the form of base shown in Fig. 2 the upper ends of the poles are surrounded with composition, which forms an ornamental head, and when the base is made in this shape, no other socket is necessary as the circuit wires can be readily attached to the leading-in wires in the customary manner of connecting keyless sockets. When the bases are molded to shape without the part that extends on the exterior of the neck, as shown in Fig. 3, the globes, can be formed with a groove, 9, so that when the cement is poured between the walls of the glass and the composition to seal the globe and the base, it will not flow into the interior but will fill the groove between the glass and the bottom of the base, making a sure seal all around. This construction also allows a material to be used for the base which contains considerable clay that contracts under heat. As the seal is made between the bottom of the groove and inside face of the base, and not necessarily, between the side walls of the globe and base, the glass may expand outwardly, and the base contract inwardly without breaking the upward seal around the groove, although there might possibly be a minute separation or pulling apart between the side walls of the neck of the globe and the base so as to break the seal.

A lamp constructed according to my invention and exhausted in the usual manner is simple, cheap and efficient. The base with the poles for the attachment of the leading-in wires is easily molded to shape and tightly secured to the open neck of the globe so that it is not necessary to make the receiver entirely of glass. And there is no danger that the parts will so expand or contract unevenly under the varying temperatures to which a lamp is subjected that the seal will be broken or that the parts will fracture. The nature of the molded base, as it does not absorb heat readily is to retain its original shape if it has been properly molded, but under any undue strain caused by a change of size or shape of either the glass or the base a yielding of the base is permitted by the grooves so that the glass will not break nor the composition fracture, or the seams or joints open.

I claim as my invention—

1. An electric lamp receiver consisting of a transparent globe, and a base molded to fit the open mouth of the globe to which it is sealed, said base being grooved so as to render it elastic, substantially as specified.

2. An electric lamp receiver consisting of a transparent globe, and a base molded with a recess for receiving the open mouth of the globe to which it is sealed, and grooved to render it elastic, substantially as specified.

3. An electric lamp receiver consisting of a transparent globe and a base molded to fit the open mouth of the globe to which it is sealed, said base having conducting poles molded therein, and grooves to render it elastic, substantially as specified.

4. An electric lamp receiver consisting of a glass globe and a base composed of insulating materials of higher heat non-conductivity than the glass molded to fit the open mouth of the receiver to which it is sealed, with a groove to render it elastic, and conducting poles for leading in wires, substantially as specified.

5. An electric lamp receiver consisting of a transparent globe, and a base molded with grooves extending inward from the inner and outer surfaces, to fit the open mouth of the globe to which it is sealed, with conducting poles molded into the base, substantially as specified.

6. An electric lamp receiver consisting of a transparent globe and a grooved base molded to fit the open mouth of the globe to which it is sealed with conducting poles molded therein, said poles having perforations of a size to just receive the leading in wires, and openings somewhat larger to receive the solder that attaches the wires to the poles, substantially as specified.

7. An electric lamp receiver consisting of a transparent globe and a base molded in one piece to fit into the interior and on the exterior of the open mouth of the globe to which it is sealed with a groove extending into the base from the interior to render it elastic, the said base having conducting poles molded therein, substantially as specified.

FREDERICK C. ROCKWELL.

Witnesses:
H. R. WILLIAMS,
C. E. BUCKLAND.